United States Patent
Tranter et al.

(12)
(10) Patent No.: US 6,405,760 B1
(45) Date of Patent: Jun. 18, 2002

(54) ACCUMULATOR

(75) Inventors: Brian R. Tranter, High Wycombe (GB); Michel Villeneuve, Vieille-Eglise (FR)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 09/880,312

(22) Filed: Jun. 13, 2001

Related U.S. Application Data

(60) Provisional application No. 60/266,615, filed on Feb. 5, 2001.

(51) Int. Cl.$^7$ ................................................. F16L 55/04
(52) U.S. Cl. ........................................ 138/31; 138/30
(58) Field of Search .............................. 138/31, 30, 121

(56) References Cited

U.S. PATENT DOCUMENTS

| | | | | |
|---|---|---|---|---|
| 1,830,869 A | * | 11/1931 | Charles | 138/30 |
| 2,847,035 A | * | 8/1958 | Peters | 138/30 |
| 3,038,553 A | * | 6/1962 | Peters | 138/30 |
| 3,076,479 A | * | 2/1963 | Ottung | 138/30 |
| 3,620,557 A | * | 11/1971 | Sturm | 285/228 |
| 3,714,964 A | * | 2/1973 | Livingston | 138/31 |
| 3,853,147 A | * | 12/1974 | Cibulka | 138/30 |
| 4,375,227 A | * | 3/1983 | Wegscheider | 138/26 |
| 4,997,009 A | * | 3/1991 | Niikura et al. | 138/30 |
| 5,638,868 A | | 6/1997 | Loran | |

* cited by examiner

*Primary Examiner*—James Hook
(74) *Attorney, Agent, or Firm*—Iandiorio & Teska

(57) ABSTRACT

An accumulator including a housing with a gas chamber and a liquid chamber therein. A primary piston is moveable in the housing and connected to the housing by a primary bellows sealing the gas chamber with respect to the liquid chamber. A secondary piston is moveable with respect to the primary piston and connected to the primary piston by a secondary bellows sealing the secondary piston with respect to the primary piston.

15 Claims, 5 Drawing Sheets

ACCUMULATOR

PRIORITY CLAIM

This application claims priority of Provisional Application Serial No. 60/266,615 filed Feb. 5, 2001.

FIELD OF THE INVENTION

This invention relates to an accumulator.

BACKGROUND OF THE INVENTION

Accumulators provide a temporary reserve of fluid under pressure. Typically the pressure source is a trapped volume of gas contained within the accumulator housing and separated from the fluid. The pressurized fluid can be used in hydraulic systems to supplement the output from the pump or to act as a fixed source of fluid for when the hydraulic pump is not energized so that, for example, the brakes on an aircraft will properly operate even when the engines are not running.

In one prior art accumulator, a separator (e.g., the combination of a piston in a chamber connected to the chamber by a bellows type seal) separates the compressed gas from the non-compressible hydraulic oil. When the hydraulic pump is operating, the hydraulic oil pressure drives the piston to compress the gas. When the hydraulic system pressure drops below the gas pressure, however, the piston moves under the action of the gas pressure displacing stored hydraulic fluid into the system as required. When the hydraulic system is shut down or hydraulic fluid leaks out, the piston goes to a full stroke stopped position and the gas pressure alone can then adversely act on the bellows and the piston. See U.S. Pat. No. 5,638,868 incorporated herein by this reference.

To alleviate the stress caused by this situation, the '868 patent proposes the use of a valve mechanism incorporating an arrow-shaped poppett with a contact pin therein connected to a compressible inner spring which captures enough fluid in the accumulator to prevent the piston from bottoming out. This design is, however, somewhat limited by, inter alia, frictional forces between the poppett and the housing. To close the valve, these forces must be overcome by the spring force and contamination or surface deterioration will add to the force and, in limiting circumstances, result in hangup of the poppett. Also, when the accumulator is in operation and the valve is open, a high demand of hydraulic fluid will tend to cause the valve to close restricting or limiting the accumulator performance capability.

SUMMARY OF THE INVENTION

It is therefore an object of this invention to provide an accumulator wherein the force driving the sealing mechanism is not dependent on a spring.

It is a further object of this invention to provide such an accumulator which allows for the use of a single seal, and which provides a large closing force.

It is a further object of this invention to provide such an accumulator in which, during operation, the sealing system is remote from the fluid port and has no influence on the accumulator performance even under conditions of high demand.

It is a further object of this invention to provide such an accumulator which has no sliding surfaces and hence no frictional forces.

It is a further object of this invention to provide such an accumulator which can incorporate a replaceable sealing seat.

It is a further object of this invention to provide such an accumulator which is reliable, maintenance free, simple in design, and easily manufactured.

This invention results from the realization that the use of a valve mechanism of prior art accumulators and the disadvantages associated therewith can be eliminated by the incorporation of a secondary piston connected to the primary piston by a secondary bellows such that the secondary piston seats on the hydraulic fluid port.

This invention features an accumulator comprising a housing including a gas chamber and a liquid chamber, a primary piston moveable in the housing and connected to the housing by a primary bellows sealing the gas chamber with respect to the liquid chamber; and a secondary piston moveable with respect to the primary piston and connected to the primary piston by a secondary bellows sealing the secondary piston with respect to the liquid chamber.

Typically there is a flow port in communication with the liquid chamber, the flow port sealable by the secondary piston. In one embodiment, the flow port is integral with the housing. In another embodiment, the flow port includes a port fitting removable from the housing.

The accumulator of this invention features a housing including a gas chamber and a liquid chamber; a primary piston moveable in the housing and connected to the housing by a primary sealing mechanism which seals the gas chamber with respect to the liquid chamber; and a secondary piston moveable with respect to the primary piston and connected to the primary piston by a secondary mechanism which seals the secondary piston.

In the preferred embodiment, the primary sealing mechanism is a primary bellows and the secondary sealing mechanism is a secondary bellows.

One accumulator of this invention includes a housing including a gas chamber and a liquid chamber; a separator between the gas chamber and the liquid chamber; and a device movable with respect to the separator and connected to the separator by a bellows seal which seals the moveable member with respect to the separator. Typically, the separator includes a primary piston movable in the housing and connected to the housing by a primary bellows sealing the gas chamber with respect to the liquid chamber. In one embodiment, the moveable member is a secondary piston moveable with respect to the primary piston and connected to the primary piston by a secondary bellows.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
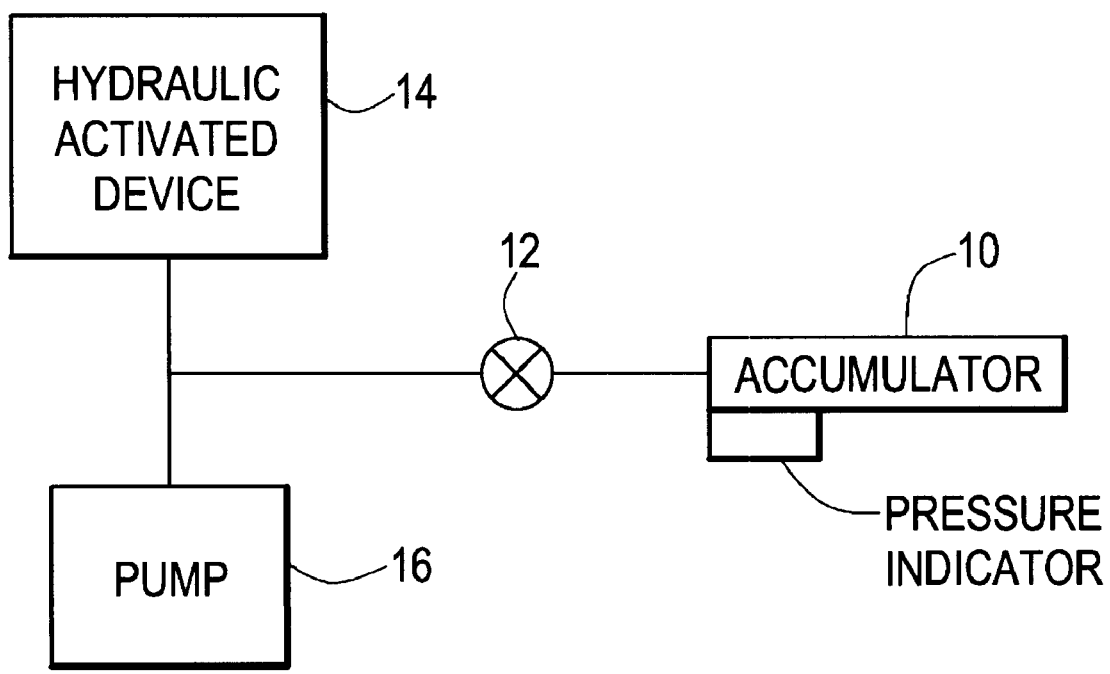
FIG. 1 is a schematic block diagram of one example of a hydraulic system incorporating the accumulator of the subject invention.

As discussed in the Background section above, accumulator 10, FIG. 1 provides a reserve source of fluid under pressure via valve 12 for hydraulically actuated device 14 (e.g., brakes).

Figure 2:
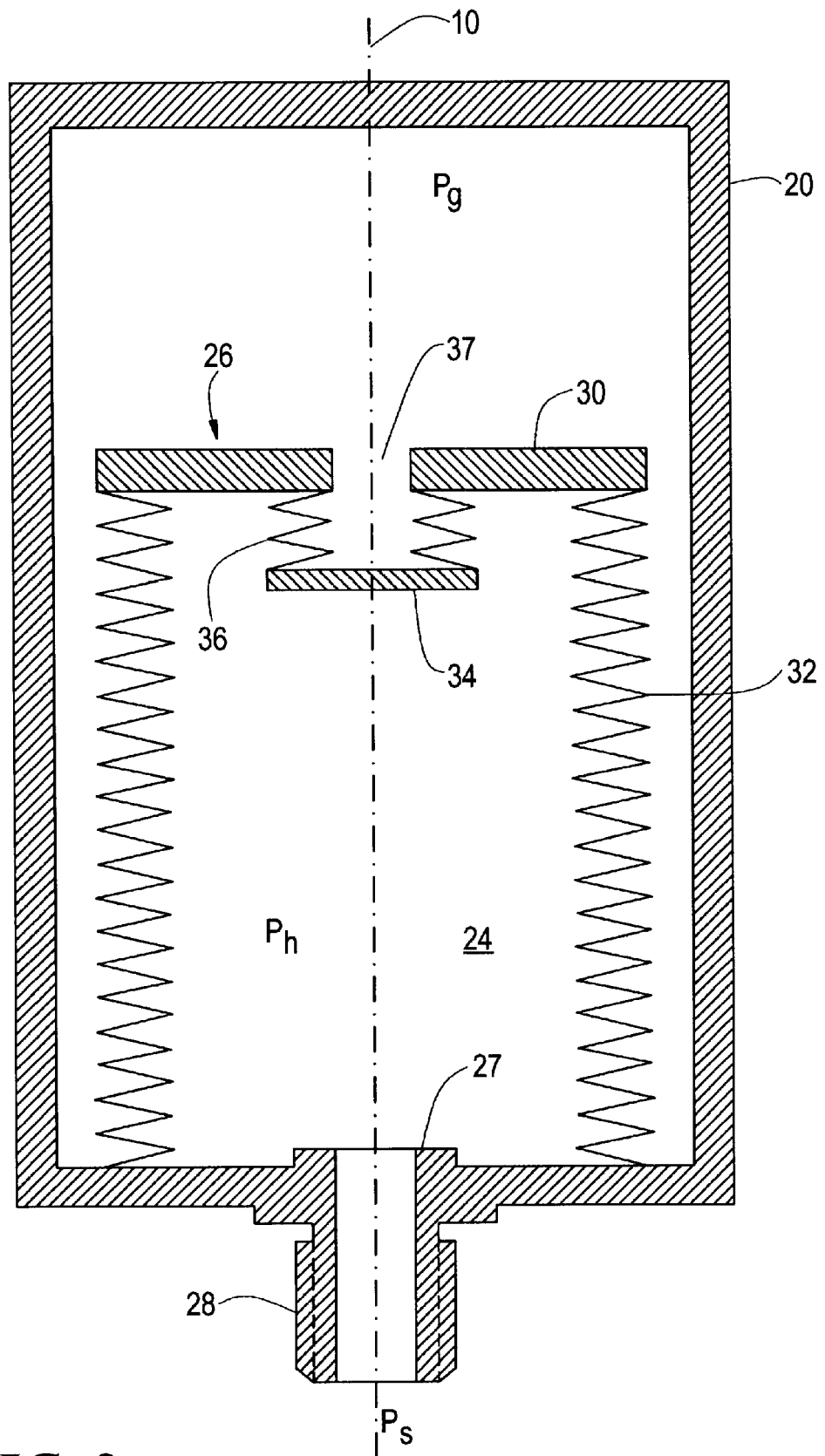
FIG. 2 is a cross sectional view of the accumulator of the subject invention showing the condition of the primary components thereof when the system is fully pressurized.

In one embodiment, accumulator 10, FIG. 2 includes housing 20 defining gas chamber 22 and liquid (e.g., hydraulic fluid) chamber 24. As in all accumulators, there is some type of a separator apparatus 26 which moves down in FIG. 2 under the effect of the charge gas pressure $P_g$ in gas chamber 22 when the system pressure $P_s$ at fluid port 28 and the corresponding liquid chamber pressure $P_h$ begins falling below the gas pressure $P_g$ providing a reserve of hydraulic fluid under the influence of the pressure $P_g$ in gas chamber 22.

In the preferred embodiment, the separator apparatus includes primary piston 30 moveable in housing 20 and connected to housing 20 by a primary sealing mechanism, typically primary bellows 32 sealing gas chamber 22 with respect to liquid chamber 24 and vice versa inside housing 20. Accumulator 10 also includes secondary piston 34 moveable with respect to primary piston 30 and connected thereto by a secondary sealing mechanism, typically secondary bellows 36 which seals secondary piston 34 with respect to liquid chamber 24. Secondary bellows seals secondary piston 34 with respect to orifice 37 in primary piston 30.

Secondary piston 34 and secondary bellows 36 are configured with respect to primary piston 30 and primary bellows 32 such that gas pressure acts on the outside of primary bellows 32 between it and the inner wall of housing 20 and on the inside of secondary bellows 36. Hydraulic pressure $P_h$ is present in liquid chamber 24, on the inside of primary bellows 32, and on the outside of secondary bellows 36.

This configuration allows secondary piston 34 to directly act as the accumulator liquid chamber sealing mechanism eliminating the need for a spring driven poppett as disclosed in U.S. Pat. No. 5,638,868. The overall result is design simplicity and flexibility.

In FIG. 2, the hydraulic system pressure $P_s$ is at its nominal level at which point it is equal to $P_h$. Piston 30 is free to move inside housing 20 and under the influence of $P_h$ moves to a position which compresses the gas in chamber 22 until $P_g$ is balances $P_h$.

Figure 3:
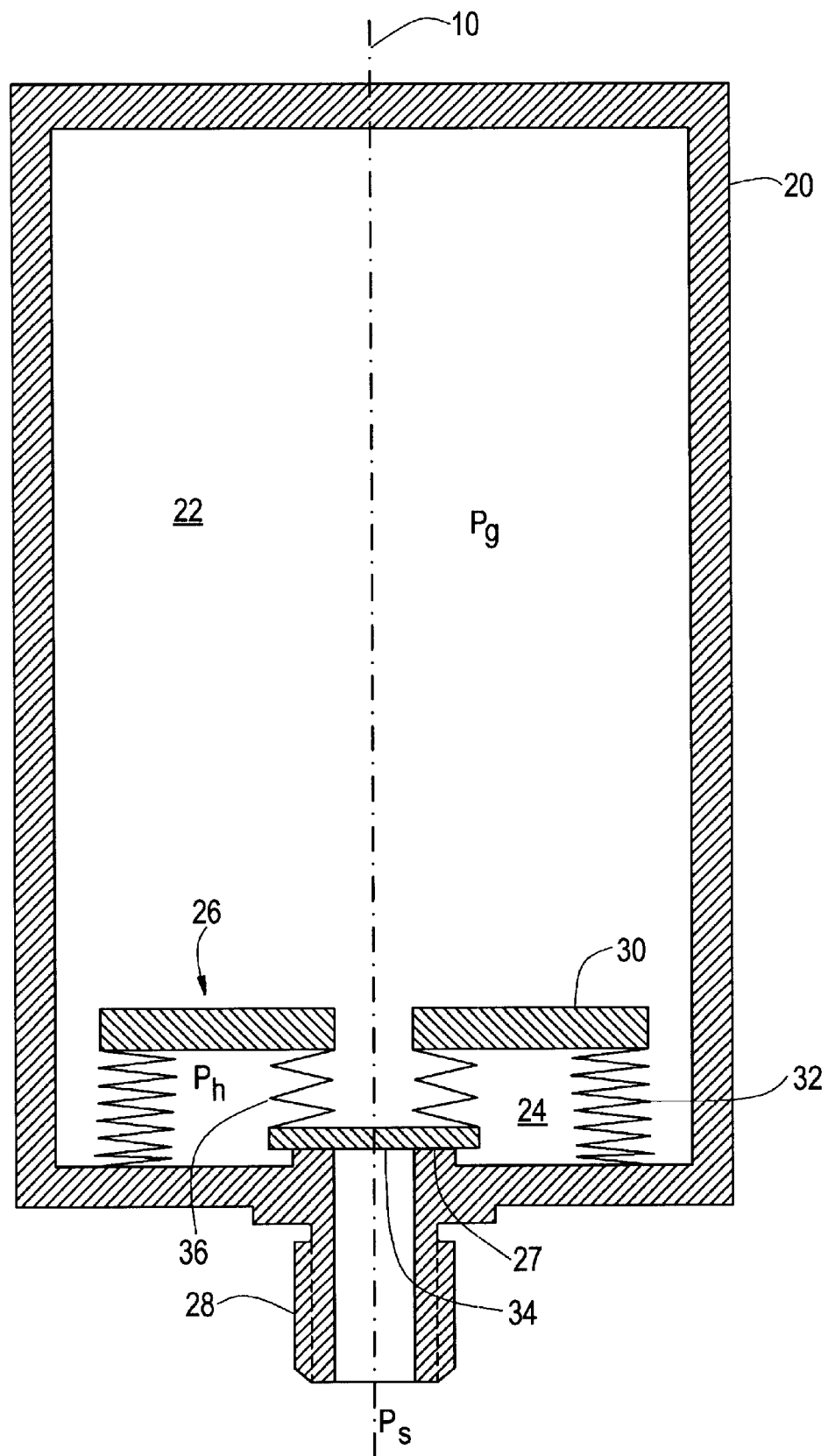
FIG. 3 is a cross sectional view of the accumulator of the subject invention showing the condition of the primary components thereof when the hydraulic system is fully depressurized.

As the hydraulic system pressure $P_s$ decreases, $P_h$ also decreases and primary piston 30 moves to maintain the equilibrium between $P_h$ and $P_g$. When secondary piston 34 reaches the fluid port 28, FIG. 3, a seal is created between it and the upper surface 27 of port 28. A volume of fluid is then trapped between the primary 32 and secondary 36 bellows such that further reductions in the system pressure $P_s$ have no effect on $P_h$ or $P_g$ which remain in equilibrium. Stops may be provided (not shown) which limit the travel distance of primary piston 30. Upon repressurization of the hydraulic system pressure, $P_s$ increases until it is approximately equal to $P_g$. Secondary piston 34 then moves free from the fluid port due to the flexibility of the secondary bellows 36 and fluid is able to flow from the port into the hydraulic chamber 24 . Further increases in system pressure $P_s$ causes primary piston 30 to move compressing the gas and returning accumulator 10 to the condition shown.

Figure 4:
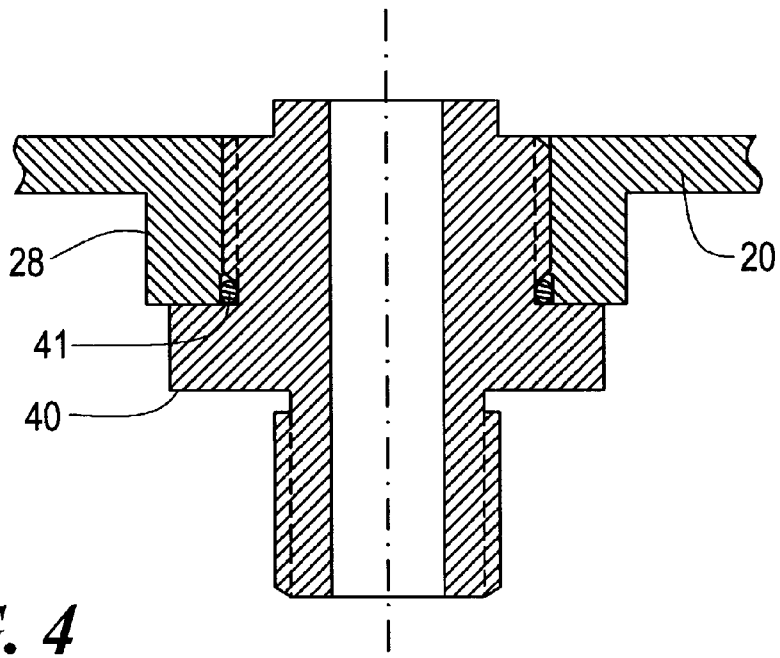
FIG. 4 is a schematic cross sectional view of another embodiment of the fluid port of the subject invention showing the condition of the secondary piston when the hydraulic system is depressurized with the addition of a separate replaceable port fitting.
Figure 5:
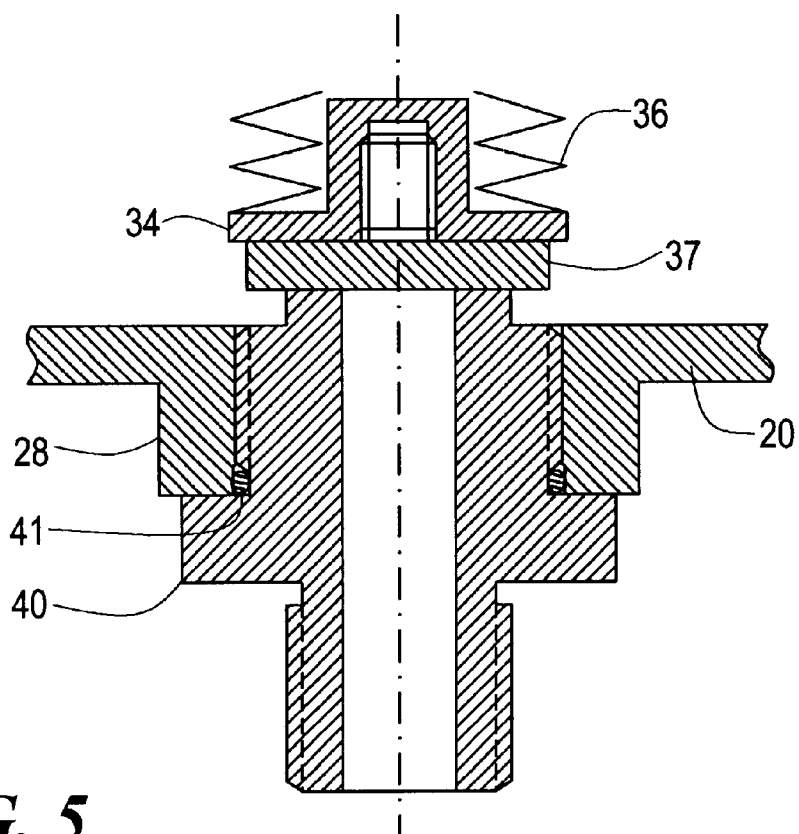
FIG. 5 is a schematic cross sectional view of still another embodiment of the fluid port of the subject invention showing the condition of the secondary piston when the hydraulic system is depressurized and with the inclusion of a replaceable seal face.
Figure 6:
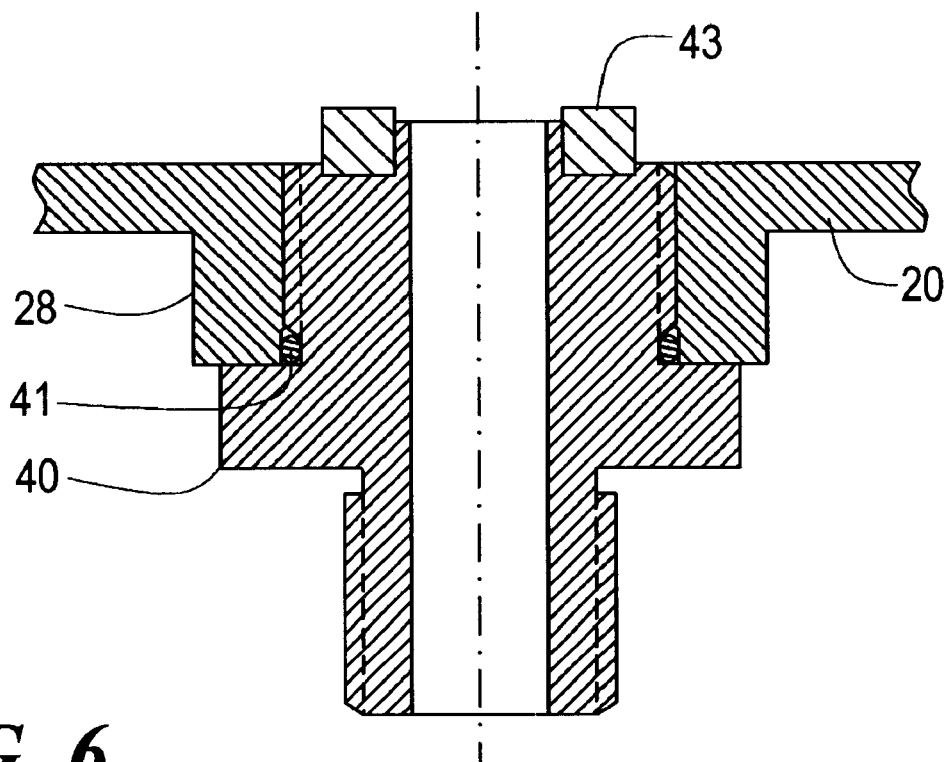
FIG. 6 is a schematic cross sectional view of still another embodiment of the fluid port of the subject invention showing the addition of a separate seal insert.

In an alternative design shown in FIG. 4, port 28 includes port fitting 40 sealed with respect to housing 20 by member 41. In a further alternative design, seat 37 is provided and attached to secondary piston 34. The diameter of seat 37 is smaller than port 28 to allow its removal. In a further alternative design, seal insert 43 constructed from an elastic or compliant material is incorporated into port fitting 40', FIG. 6.

In any embodiment, the idea behind design of secondary bellows 36, FIG. 2 is that it will be in its normal position subject only to a small pressure differential which will tend to compress it as primary bellows 32 extends and will tend to extend it as the primary bellows compresses. When the accumulator is discharged, the primary bellows is in compression meaning the secondary bellows will be slightly extended until a seal is made between the secondary piston and the fluid port. The closing force on the secondary piston is then due to the pressure ($P_h$ and $P_g$) acting on the fluid port sealing area. The pressure balance is maintained across both primary and secondary bellows regardless of thermal contraction and expansion of the trapped fluid as well as in the event of leakage of fluid due to the flexibility of both primary and secondary bellows. The use of the secondary bellows in accordance with the subject invention allows the use of a single seal, eliminates the needs for a sliding seal, or separate valve and provides for a large closing force. Movement of the secondary piston by compression and extension of the secondary bellows is thus clearly advantageous in view of the known prior art.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An accumulator comprising:
    a housing including a gas chamber and a liquid chamber;
    a primary piston moveable in the housing and connected to the housing by a primary bellows sealing the gas chamber with respect to the liquid chamber; and
    a secondary piston moveable with respect to the primary piston and connected to the primary piston by a secondary bellows sealing the secondary piston with respect to the gas chamber, the primary piston, the primary bellows, the secondary piston, and the secondary bellows enclosing a liquid therein and defining the liquid chamber.

2. The accumulator of claim 1 further including a flow port in communication with the liquid chamber, the flow port sealable by the secondary piston.

3. The accumulator of claim 2 in which the flow port is integral with the housing.

4. The accumulator of claim 2 in which the flow port includes a port fitting removable from the housing.

5. An accumulator comprising:

a housing including a gas chamber and a liquid chamber;

a primary piston moveable in the housing and connected to the housing by a primary sealing mechanism which seals the gas chamber with respect to the liquid chamber; and a secondary piston moveable with respect to the primary piston and connected to the primary piston by a secondary sealing mechanism sealing the secondary piston with respect to the liquid chamber, the primary piston, the primary sealing mechanism, the secondary piston, and the secondary sealing mechanism enclosing a liquid therein and defining the liquid chamber.

6. The accumulator of claim 5 in which the primary sealing mechanism is a primary bellows.

7. The accumulator of claim 5 in which the secondary sealing mechanism is a secondary bellows.

8. An accumulator comprising:

a housing including a gas chamber and a liquid chamber;

a flow port in the housing in communication with the liquid chamber;

a separator between the gas chamber and the liquid chamber; and a device movable with respect to the separator and connected to the separator by a bellows seal which seals the moveable member with respect to the separator, the device operably disposed in the housing to seal the flow port when the liquid chamber decreases in pressure below the pressure of the gas chamber.

9. The accumulator of claim 8 in which the separator includes a primary piston moveable in the housing and connected to the housing by a primary bellows sealing the gas chamber with respect to the liquid chamber.

10. The accumulator of claim 9 in which the moveable member is a secondary piston moveable with respect to the primary piston and connected to the primary piston by a secondary bellows.

11. The accumulator of claim 10 further including a port in the primary piston in communication with the gas chamber so that movement of the secondary piston is dependent on the pressure of the gas chamber.

12. An accumulator comprising:

a housing including a gas chamber and a liquid chamber;

a primary piston moveable in the housing and connected to the housing by a primary bellows sealing the gas chamber with respect to the liquid chamber;

a secondary piston moveable with respect to the primary piston and connected to the primary piston by a secondary bellows sealing the secondary piston with respect to the gas chamber; and a flow port in communication with the liquid chamber, the flow port sealable by the secondary piston.

13. An accumulator comprising:

a housing including a gas chamber and a liquid chamber;

a primary piston moveable in the housing and connected to the housing by a primary sealing mechanism which seals the gas chamber with respect to the liquid chamber;

a secondary piston moveable with respect to the primary piston; and a flow port in communication with the liquid chamber, the flow port sealable by the secondary piston.

14. An accumulator comprising:

a housing including a gas chamber and a liquid chamber;

a flow port in the housing in communication with the liquid chamber;

a separator between the gas chamber and the liquid chamber; and a device movable with respect to the separator and connected to the separator by a bellows seal which seals the moveable member with respect to the separator, the device operatively disposed to seal the flow port when the liquid chamber decreases in pressure below the pressure of the gas chamber.

15. An accumulator comprising:

a housing including a gas chamber and a liquid chamber;

a separator between the gas chamber and the liquid chamber; and a device movable with respect to the separator and connected to the separator by a bellows seal which seals the moveable member with respect to the separator;

the separator including a primary piston moveable in the housing and connected to the housing by a primary bellows sealing the gas chamber with respect to the liquid chamber;

the moveable member being a secondary piston moveable with respect to the primary piston and connected to the primary piston by a secondary bellows; and a port in the primary piston in communication with the gas chamber so that movement of the secondary piston is dependent on the pressure of the gas chamber.

* * * * *